(12) United States Patent  
Xueping

(10) Patent No.: US 7,471,414 B2  
(45) Date of Patent: Dec. 30, 2008

(54) IMAGE PROCESSING METHOD AND APPARATUS, AND COMPUTER READABLE DATA STORING MEDIUM STORING A PROGRAM FOR IMAGE PROCESSING

(75) Inventor: Liu Xueping, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 989 days.

(21) Appl. No.: 10/390,006

(22) Filed: Mar. 18, 2003

(65) Prior Publication Data

US 2003/0179411 A1    Sep. 25, 2003

(30) Foreign Application Priority Data

Mar. 18, 2002    (JP) .............................. 2002-074289

(51) Int. Cl.
*G06F 15/00* (2006.01)
*G06K 15/00* (2006.01)
*G03F 3/08* (2006.01)
*G06K 9/00* (2006.01)

(52) U.S. Cl. ........................ 358/1.9; 358/3.22; 358/518; 382/167; 382/163

(58) Field of Classification Search ................... 358/1.9, 358/518, 520, 540, 450, 537, 538, 452, 453, 358/3.22, 517; 382/167, 302, 173, 180, 294, 382/163, 164
See application file for complete search history.

(56) References Cited

U.S. PATENT DOCUMENTS

| | | | | |
|---|---|---|---|---|
| 5,196,922 A * | 3/1993 | Yeomans | ................... | 348/578 |
| 5,311,329 A * | 5/1994 | Haeberli et al. | ............. | 358/448 |
| 5,523,849 A * | 6/1996 | Jamzadeh | ................... | 358/1.9 |
| 5,524,069 A * | 6/1996 | Inoue | .......................... | 382/270 |
| 5,701,401 A * | 12/1997 | Harrington et al. | ........... | 358/1.9 |
| 5,832,141 A * | 11/1998 | Ishida et al. | ................ | 382/298 |
| 5,896,464 A * | 4/1999 | Horiuchi et al. | ............. | 382/178 |
| 5,933,527 A * | 8/1999 | Ishikawa | ..................... | 382/190 |
| 5,956,435 A * | 9/1999 | Buzug et al. | ................ | 382/283 |
| 5,982,953 A * | 11/1999 | Yanagita et al. | ............. | 382/294 |
| 5,991,513 A * | 11/1999 | Levien | ...................... | 358/3.26 |
| 6,014,454 A * | 1/2000 | Kunkler | ...................... | 382/137 |
| 6,028,958 A * | 2/2000 | Kanamori | ................... | 382/171 |
| 6,137,923 A * | 10/2000 | Takeo et al. | ................. | 382/308 |
| 6,140,997 A * | 10/2000 | Tanaka | ........................ | 345/604 |
| 6,148,118 A * | 11/2000 | Murakami et al. | .......... | 382/284 |
| 6,222,642 B1 * | 4/2001 | Farrell et al. | ................. | 358/1.9 |
| 6,269,186 B1 * | 7/2001 | Makita | ....................... | 382/172 |
| 6,275,615 B1 * | 8/2001 | Ida et al. | ...................... | 382/232 |
| 6,377,698 B1 * | 4/2002 | Cumoli et al. | ............. | 382/101 |
| 6,396,949 B1 * | 5/2002 | Nichani | ...................... | 382/173 |
| 6,400,844 B1 * | 6/2002 | Fan et al. | .................... | 382/173 |

(Continued)

*Primary Examiner*—Madeleine A Nguyen
(74) *Attorney, Agent, or Firm*—Dickstein Shapiro LLP

(57) ABSTRACT

An image processing apparatus including an image reading mechanism, a display, a memory, an image processing mechanism, an image creating mechanism, and a controller. The image processing mechanism performs first and second corrections using the plurality of stepped values. The image creating mechanism creates first and second subtractive images based on a first corrected image corrected by the first correction and a second corrected image corrected by the second correction. The controller controls the display to display the input image, the first corrected image, the final corrected image, the first subtractive image, and the second subtractive image in a screen image. A method of image processing and a computer readable data storing medium storing a program for image processing are also described.

32 Claims, 9 Drawing Sheets

U.S. PATENT DOCUMENTS

| | | | |
|---|---|---|---|
| 6,404,920 B1 * | 6/2002 | Hsu | 382/190 |
| 6,549,658 B1 * | 4/2003 | Schweid et al. | 382/173 |
| 6,556,711 B2 * | 4/2003 | Koga et al. | 382/173 |
| 6,628,833 B1 * | 9/2003 | Horie | 382/173 |
| 6,658,163 B1 * | 12/2003 | Takaoka | 382/254 |
| 6,664,973 B1 * | 12/2003 | Iwamoto et al. | 345/589 |
| 6,681,058 B1 * | 1/2004 | Hanna et al. | 382/294 |
| 6,720,997 B1 * | 4/2004 | Horie et al. | 348/218.1 |
| 6,728,391 B1 * | 4/2004 | Wu et al. | 382/101 |
| 6,741,758 B2 * | 5/2004 | Hayashi et al. | 382/294 |
| 6,795,589 B1 * | 9/2004 | Tlaskal et al. | 382/284 |
| 6,798,897 B1 * | 9/2004 | Rosenberg | 382/107 |
| 6,822,761 B2 * | 11/2004 | Sakaki et al. | 358/1.9 |
| 6,850,272 B1 * | 2/2005 | Terashita | 348/223.1 |
| 6,874,420 B2 * | 4/2005 | Lewis et al. | 101/485 |
| 6,917,707 B1 * | 7/2005 | Kubota | 382/176 |
| 7,024,054 B2 * | 4/2006 | Cahill et al. | 382/294 |
| 7,068,328 B1 * | 6/2006 | Mino | 348/672 |
| 7,085,007 B2 * | 8/2006 | Weldy | 358/1.9 |
| 2001/0022663 A1 * | 9/2001 | Ishikawa et al. | 358/1.9 |
| 2002/0021840 A1 * | 2/2002 | Ohara et al. | 382/199 |
| 2002/0037090 A1 * | 3/2002 | Powell et al. | 382/100 |
| 2002/0037100 A1 * | 3/2002 | Toda et al. | 382/166 |
| 2002/0071131 A1 | 6/2002 | Nishida | |
| 2003/0099397 A1 * | 5/2003 | Matsugu et al. | 382/173 |
| 2004/0130737 A1 * | 7/2004 | Kamimura et al. | 358/1.9 |
| 2005/0041267 A1 * | 2/2005 | Hirayama | 358/2.1 |
| 2006/0078224 A1 * | 4/2006 | Hirosawa | 382/284 |
| 2006/0187477 A1 * | 8/2006 | Maki et al. | 358/1.9 |
| 2006/0188148 A1 * | 8/2006 | Nako et al. | 382/162 |
| 2006/0197990 A1 * | 9/2006 | Myodo et al. | 358/3.06 |

* cited by examiner

IMAGE PROCESSING METHOD AND APPARATUS, AND COMPUTER READABLE DATA STORING MEDIUM STORING A PROGRAM FOR IMAGE PROCESSING

FIELD OF THE INVENTION

The present invention relates to an image processing method and apparatus, and more particularly to an image processing method and apparatus capable of correcting an image with different image density threshold values. The present invention also relates to a computer readable data storing medium storing a program to perform operations of the image processing method.

BACKGROUND OF THE INVENTION

Discussion of the Background

When a double-sided color document is processed with a background color scanner or a background digital color copying machine, an image on the back surface of the document is often transferred to a resultant image. This is called a back-image transfer problem.

One attempt to correct an image having a background image transfer problem is described in a publication of U.S. patent application, No. 20020071131 published on Jun. 13, 2002. This attempt eliminates an edge contour of a back-image from an image in process.

When such correction is performed, however, it is not easy for a user to judge whether a back-image is sufficiently removed from the corrected image. Generally, users check images in the front and back surfaces of the original sheet and the corrected image, back and forth. This is not an easy task since a user's eye sight is always moving from one image to another.

In addition, the back-image transfer problem is a delicate problem often requiring an extremely small amount of correction. However, this is not taken into account by the above attempt.

SUMMARY OF THE INVENTION

In view of the foregoing, it is an object of the present invention to provide a novel image processing apparatus which performs a correction for an image having a back-image transfer problem to an arbitrary extent in a way such that a result can easily be judged by a user.

Another object of the present invention is to provide a novel image processing method which performs a correction for an image having a back-image transfer problem to an arbitrary extent in a way such that a result can easily be judged by a user.

Another object of the present invention is to provide a novel computer readable data storing medium storing a program for image processing which performs a correction for an image having a back-image transfer problem to an arbitrary extent in a way such that a result can easily be judged by a user.

To achieve the above-mentioned object, in one embodiment, a novel image processing apparatus includes an image reading mechanism, a display, a memory, an image processing mechanism, and an image creating mechanism, and a controller. The image reading mechanism is configured to read an original image to produce an input image. The display displays an image. The memory stores a plurality of stepped values representing an image density threshold parameter. The image processing mechanism is configured to perform an image processing operation at least two times using the plurality of stepped values in an increasing order. The image creating mechanism is configured to create first and second subtractive images based on a first corrected image corrected by a first correction performed by the image processing mechanism and a second corrected image corrected by a second correction performed by the image processing mechanism. The controller is configured to control the display to display the input image, the first corrected image, the lastly corrected image, the first subtractive image, and the second subtractive image in a screen image.

The image creating mechanism may create the first subtractive image by comparing the first corrected image with the second corrected image in units of pixel, subtracting common image elements between the first and second corrected images from the first corrected image, and assigning a predetermined white density value to an area where the common image elements are subtracted. Further, the image creating mechanism may create the second subtractive image by comparing the first corrected image with the second corrected image, subtracting common image elements between the first and second corrected images from the second corrected image, and assigning the predetermined white density value to an area where the common image elements are subtracted.

The controller may control the display to display the first and second subtractive images at a same position in an alternate fashion in the screen image.

The controller may control switching between a first display mode in which the display displays the screen image with the first subtractive image and a second display mode in which the display displays the screen image with the second subtractive image. The controller may control a change of the predetermined white density value.

Further, to achieve the above-mentioned object, in one embodiment, a novel image processing method includes the steps of storing, reading, performing, creating and controlling. The storing step stores a plurality of stepped values representing an image density threshold parameter. The reading step reads an original image to produce an input image. The performing step performs an image processing operation at least two times using the plurality of stepped values in an increasing order. The creating step creates first and second subtractive images based on a first corrected image corrected by a first correction performed by the performing step and a second corrected image corrected by a second correction performed by the performing step. The controlling step controls the display of the input image, the first corrected image, the final corrected image, the first subtractive image, and the second subtractive image in a screen image.

The creating step may create the first subtractive image by performing the sub-steps of comparing the first corrected image with the second corrected image, subtracting common image elements between the first and second corrected images from the first corrected image, and assigning a predetermined white density value to an area where the common image elements are subtracted. Further, the creating step may create the second subtractive image by performing the sub-steps of comparing the first corrected image with the second corrected image, subtracting common image elements between the first and second corrected images from the second corrected image, and assigning the predetermined white density density value to an area where the common image elements are subtracted.

The controlling step may control the display of the first and second subtractive images at a same position in an alternate fashion in the screen image.

Further, to achieve the above-mentioned object, in one embodiment, a novel computer readable data recording medium storing a program for image processing including the steps of storing, reading, performing, creating, and controlling. The storing step stores a plurality of stepped values representing an image density threshold parameter. The reading step reads an original image to produce an input image. The performing step performs an image processing operation at least two times using the plurality of stepped values in an increasing order. The creating step creates first and second subtractive images based on a first corrected image corrected by a first correction performed by the performing step and a second corrected image corrected by a second correction performed by the performing step. The controlling step controls the display of the input image, the first corrected image, the final corrected image, the first subtractive image, and the second subtractive image in a screen image.

The creating step may create the first subtractive image by performing the sub-steps of comparing the first corrected image with the second corrected image, subtracting common image elements between the first and second corrected images from the first corrected image, and assigning a predetermined white density value to an area where the common image elements are subtracted. Further, the creating step may create the second subtractive image by performing the sub-steps of comparing the first corrected image with the second corrected image, subtracting common image elements between the first and second corrected images from the second corrected image, and assigning the predetermined white density value to an area where the common image elements are subtracted.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

This patent specification is based on Japanese patent application, No. JPAP2002-074289 filed on Mar. 03, 2002 in the Japanese Patent Office, the entire contents of which are incorporated by reference herein.

Figure 1:
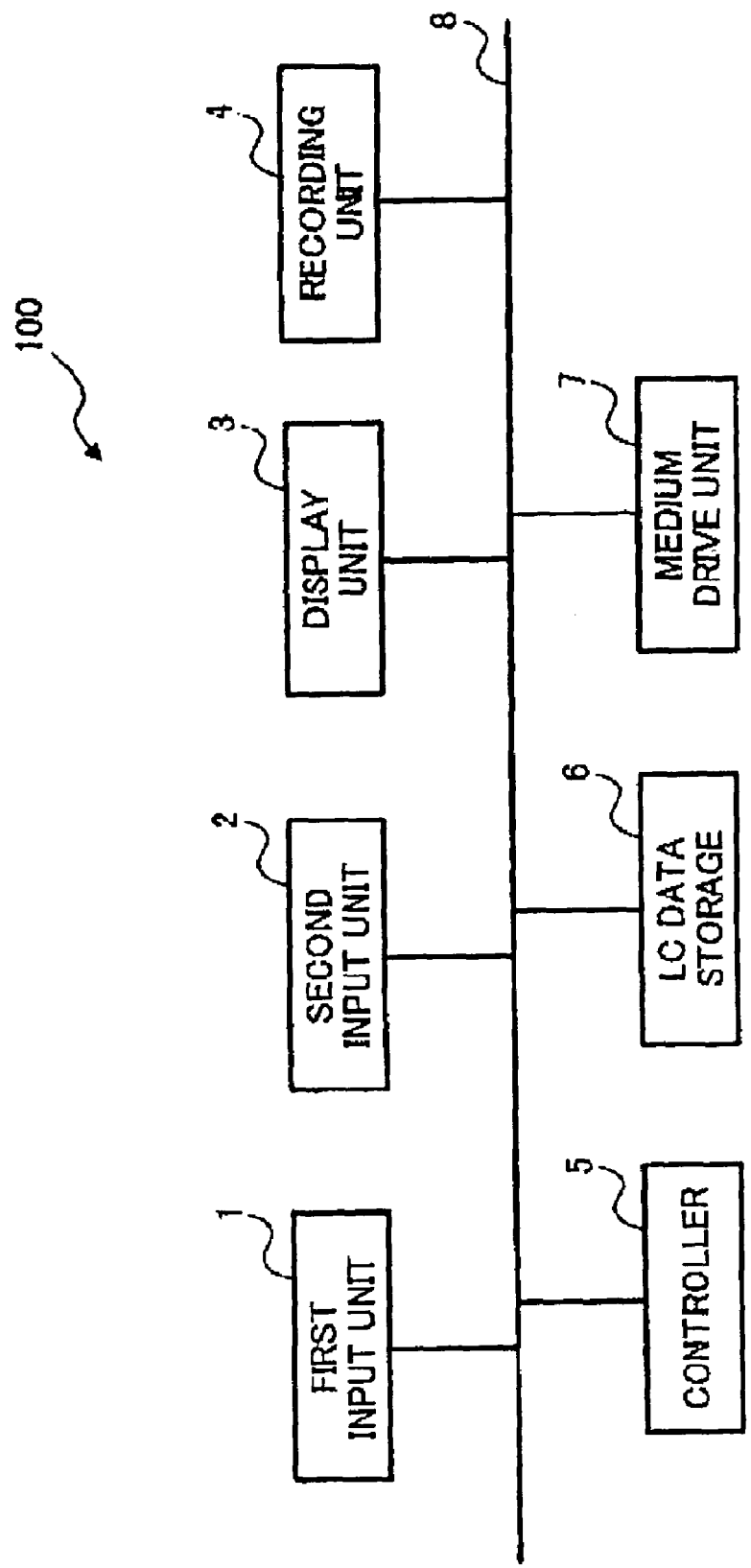
FIG. 1 is a block diagram of an image processing apparatus according to a preferred embodiment of the present invention.

In describing preferred embodiments illustrated in the drawings, specific terminology is employed for the sake of clarity. However the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an image processing apparatus 100 according to a preferred embodiment of the present invention is explained with reference to FIG. 1. As shown in FIG. 1, the image processing apparatus 100 includes a first input unit 1, a second input unit 2, a display unit 3, a recording unit 4, a controller 5, a large capacity (LC) data storage 6, a medium drive unit 7, and a system data bus 8.

The first input unit 1 includes, for example, a keyboard, a mouse, and a touch-sensitive panel although they are not shown. The first input unit 1 enters various kinds of instructions and data necessary for an image processing operation, including various kinds of information including operation modes, display modes, and their associated parameters. The second input unit 2 includes at least one of, for example, a digital still camera and a scanner, which are not shown, and inputs an image into the image processing apparatus 100. The display unit 3 includes a CRT (cathode-ray tube) display or a liquid crystal display (LCD), for example. The display unit 3 displays information entered through the first and second input units 1 and 2, respectively. The recording unit 4 includes a laser printer, for example, and records processed images on a recording sheet.

The controller 5 controls the entire operations of the image processing apparatus 100 to execute various operations including the image processing operation. The controller includes a CPU (central processing unit) 10 and a memory 13 (see FIG. 3) which includes a ROM (read only memory) and RAM (random access memory). The memory 13 stores various kinds of programs and associated data necessary for the CPU 10 to perform the operations including the image processing operation. The programs stored in the memory 13 includes an operating system and a plurality of programs for image processing. These programs are downloaded to the memory 13 from a data medium driven by the medium drive unit 7. The data medium may be a CD-ROM (compact disc read only memory), for example, and the medium drive unit 7 may be a CD-ROM drive unit. It is also possible to execute the image processing programs and a data input and output operation, for example, directly from the medium drive unit 7 without downloading to the memory 13. Further, if the above-mentioned programs and associated data are initially stored in the ROM of the memory 13, the medium drive unit 7 can be eliminated.

The large capacity data storage 6 includes a hard disc drive and stores programs and data, as well as transaction data during an execution of a program, on a temporary-time basis. The large capacity data storage 6 also serves as an image buffer to temporarily store an image which has been corrected through the image processing operation, which is output into a file, for example, by an instruction of the CPU 10.

The above-mentioned components included in the image processing apparatus 100 are connected to the system data bus 8 to communicate with each other.

The above-mentioned data medium may also be one of semiconductor memory devices including a ROM (read only memory) and a nonvolatile memory card, for example. In this case, the medium drive unit 7 can be eliminated. The data medium may also be one of magnetic media including a DVD (digital versatile disc), a DVD-ROM (digital versatile disc read only memory), a MO (magneto-optic disc), a MD (magnetic disc), and a CD-R (compact disc recordable), for example. Further, the data medium may be one of magnetic media including a magnetic tape and a flexible disc, for example.

In addition, it is also possible to install the above-mentioned various programs in the image processing apparatus 100 by downloading from a server, without using the data medium such as the CD-ROM. In this case, the image processing apparatus 100 needs to be connected to a network to which the server is connected. In this environment, the image processing apparatus 100 downloads a part, of or the entire operation system and the plurality of programs for image processing. By using these downloaded programs, the image processing apparatus 100 executes the image processing operation. In addition, it is also possible that the image processing apparatus 100 downloads a program-execution program from the server and performs the image processing operation in accordance with instructions of the program-execution program.

The image processing apparatus 100 having the above-described structure performs a weak-image elimination to eliminate a low density image such as, for example, an image transmitted from a back surface of an original sheet during a scanning operation using a scanner. The image processing apparatus 100 performs this weak-image elimination by changing a threshold value of an image density used as an image density cut-off parameter. With the weak-image elimination, the image processing apparatus 100 can eliminate an expected thin dirty background as well as a transferred-from-back image. Accordingly, this weak-image elimination can be applied to various kinds of images including a scanned image obtained with a scanner and an image obtained with a digital still camera, for example.

The image processing apparatus 100 performs the weak-image elimination during the image processing operation, in which an input image and corrected images are displayed at a time in the same screen image of the display unit 3. FIGS. 2A-2D show exemplary screen image 3a-3d, respectively, for the weak-image elimination when displayed on the display unit 3. The screen image 3a of FIG. 2A includes a plurality of images including first and second push-button icons A1 and A2, an input image B1 which is as obtained and is not processed through the weak-image elimination, and a first corrected image B2 which is obtained by correcting the input image B1 through the weak-image elimination using a first threshold value Th1 as an image density cutoff parameter. In the input image B1, an image of a smiling circle with shading is an image from the front surface of an original sheet which is scanned but letter images A, B, and C, an image of parallelogram, and an image of a heart-like shape are images transferred from the back surface of the original sheet. The first corrected image B2 shows the letter images of A, B, and C are eliminate, but other images transferred from the back surface remain.

Figure 2A:
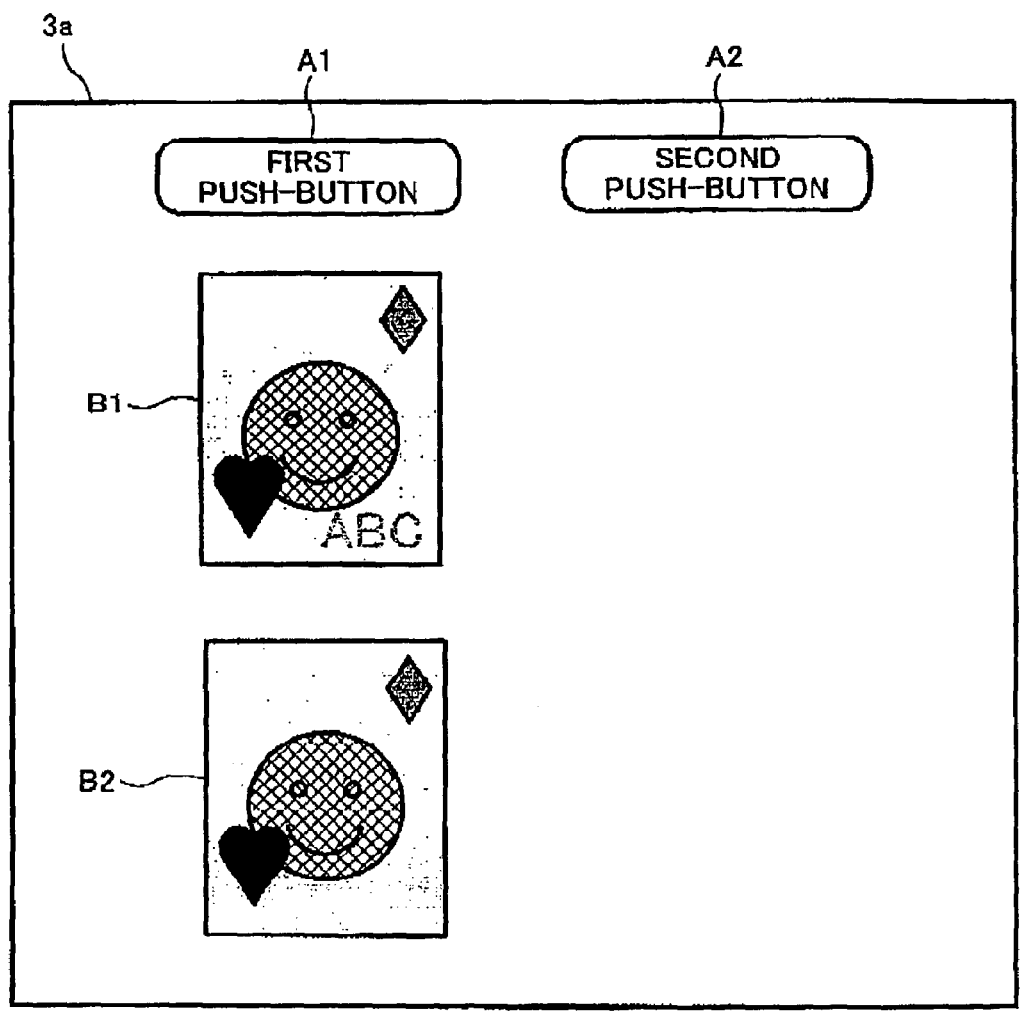
FIGS. 2A-2E are illustrations for explaining screen images created during a procedure of a weak-image elimination performed by the image processing apparatus of FIG. 1.
Figure 2B:
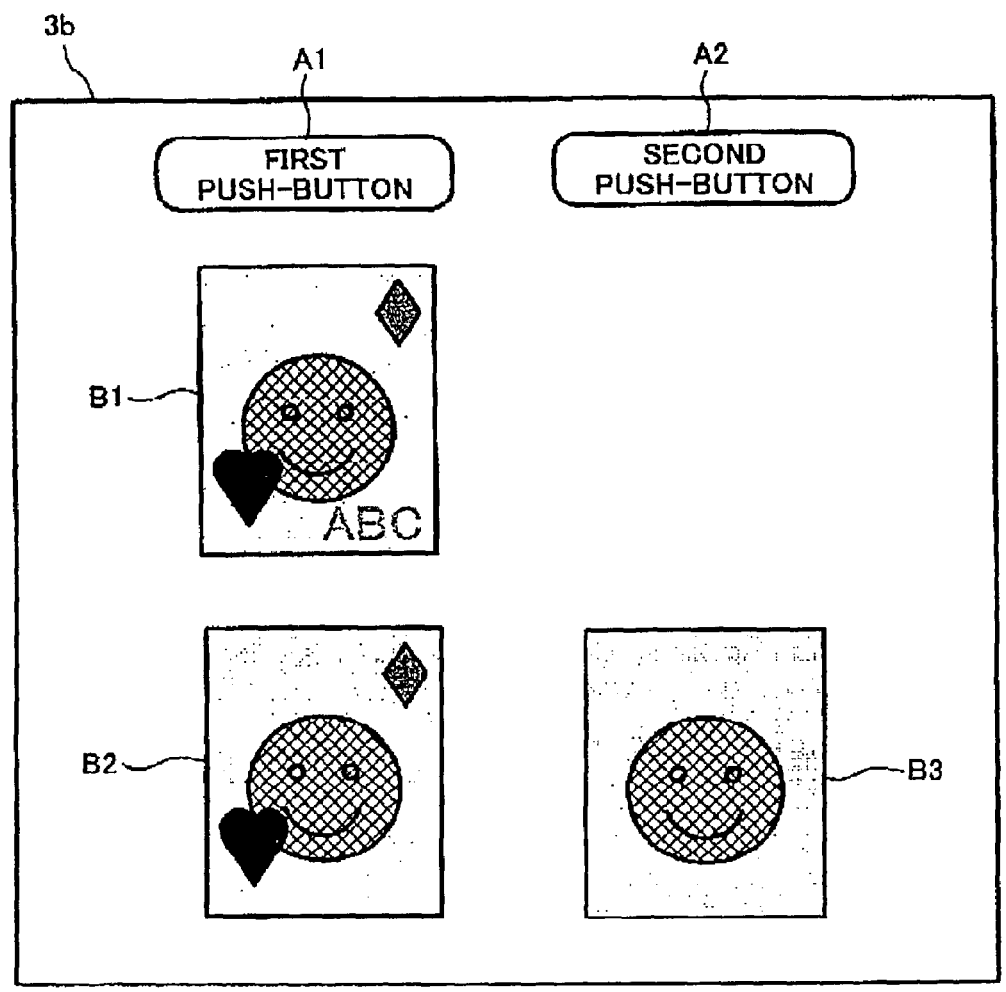

The screen image 3b of FIG. 2B includes a plurality of images including the first and second push-button icons A1 and A2, the input image B1, the first corrected image B2, and a second corrected image B3 which is obtained by correcting the input image B1 through the weak-image elimination using a second threshold value Th2 as the image density cutoff parameter. The second threshold value Th2 is greater (darker) than the first threshold value Th1. The second corrected image B3 shows the letter images A, B, and C and other images transferred from the back surface are all eliminated.

Figure 2C:
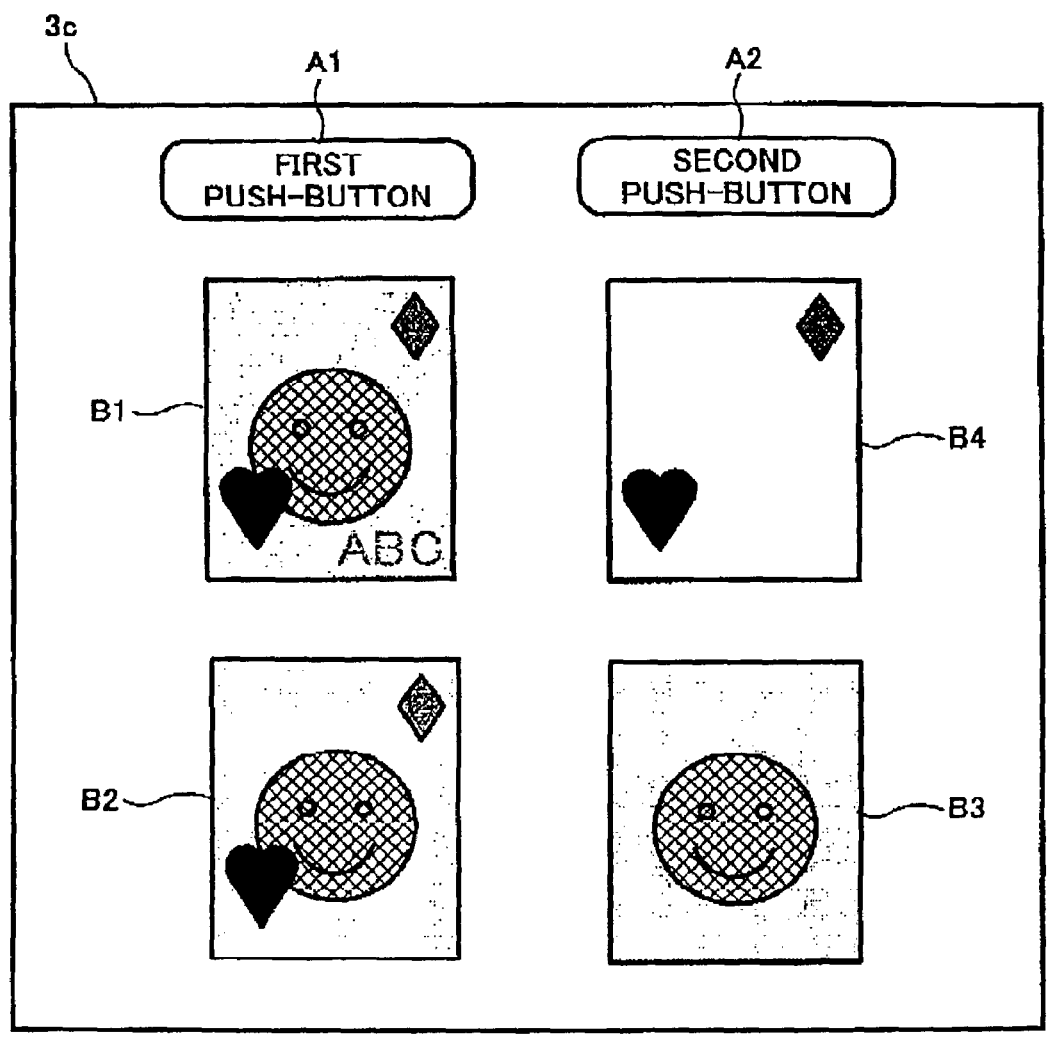

The screen image 3c of FIG. 2C includes a plurality of images including the first and second push-button icons A1 and A2, the input image B1, the first corrected image B2, the second corrected image B3, and a first subtractive image B4. The first subtractive image B4 is an image obtained by comparing the first corrected image B2 with the second corrected image B3 in units of pixel, subtracting common image elements between the first and second corrected images B2 and B3 from the first corrected image B2, and assigning a predetermined white density value to an area where the subtraction is performed. The first subtractive image B4 shows the images of letters A, B, and C are eliminated but the images of the parallelogram and heart-like shape remain.

Figure 2D:
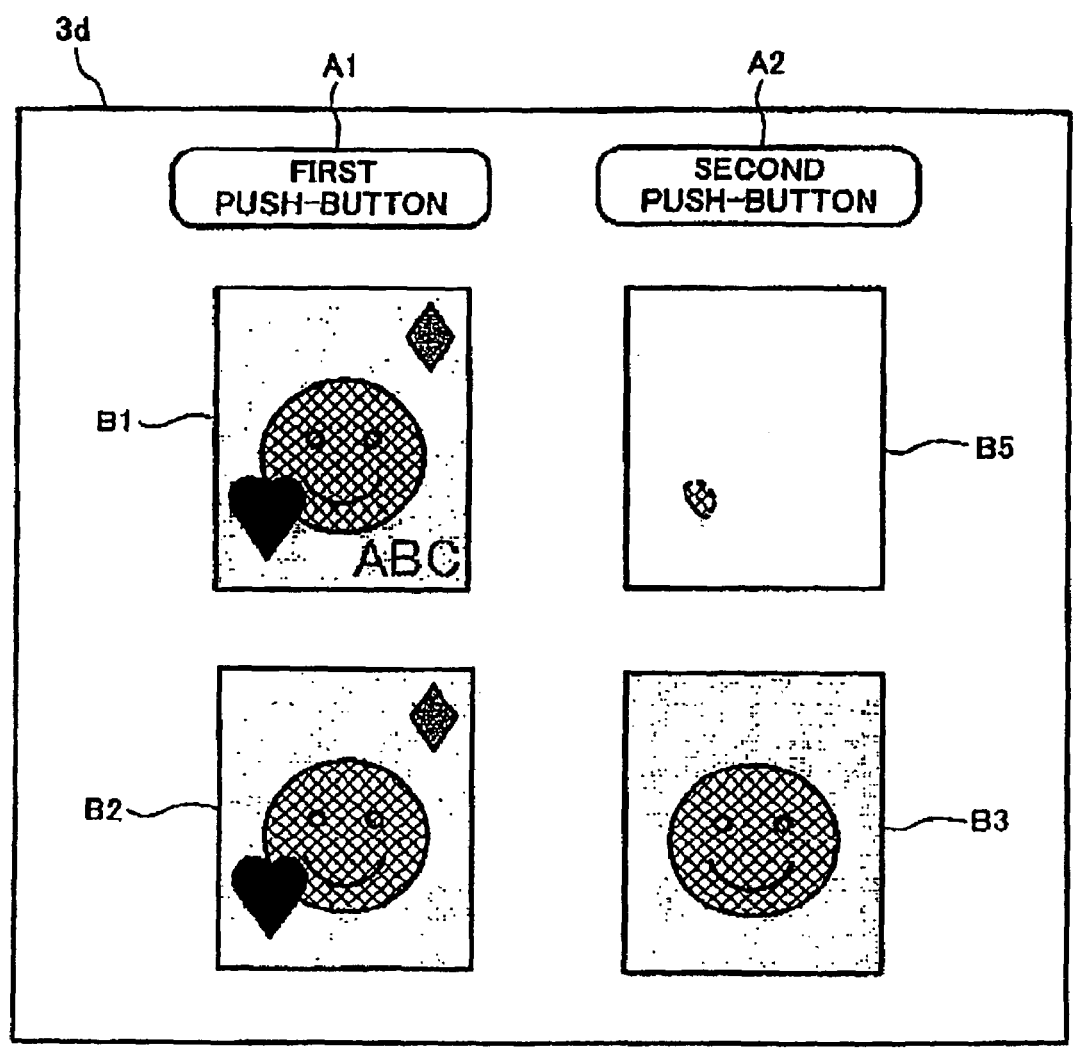

The screen image 3d of FIG. 2D includes a plurality of images including the first and second push-button icons A1 and A2, the input image B1, the first corrected image B2, the second corrected image B3, and a second subtractive image B5. The second subtractive image B5 is an image obtained by comparing the first corrected image B2 with the second corrected image B3, subtracting common image elements between the first and second corrected images B2 and B3 from the second corrected image B3, and assigning the predetermined white density value in units of pixel to an area where the subtraction is performed. The second subtractive image B5 shows all the images transferred from the back surface of the original sheet scanned are eliminated.

Figure 2E:
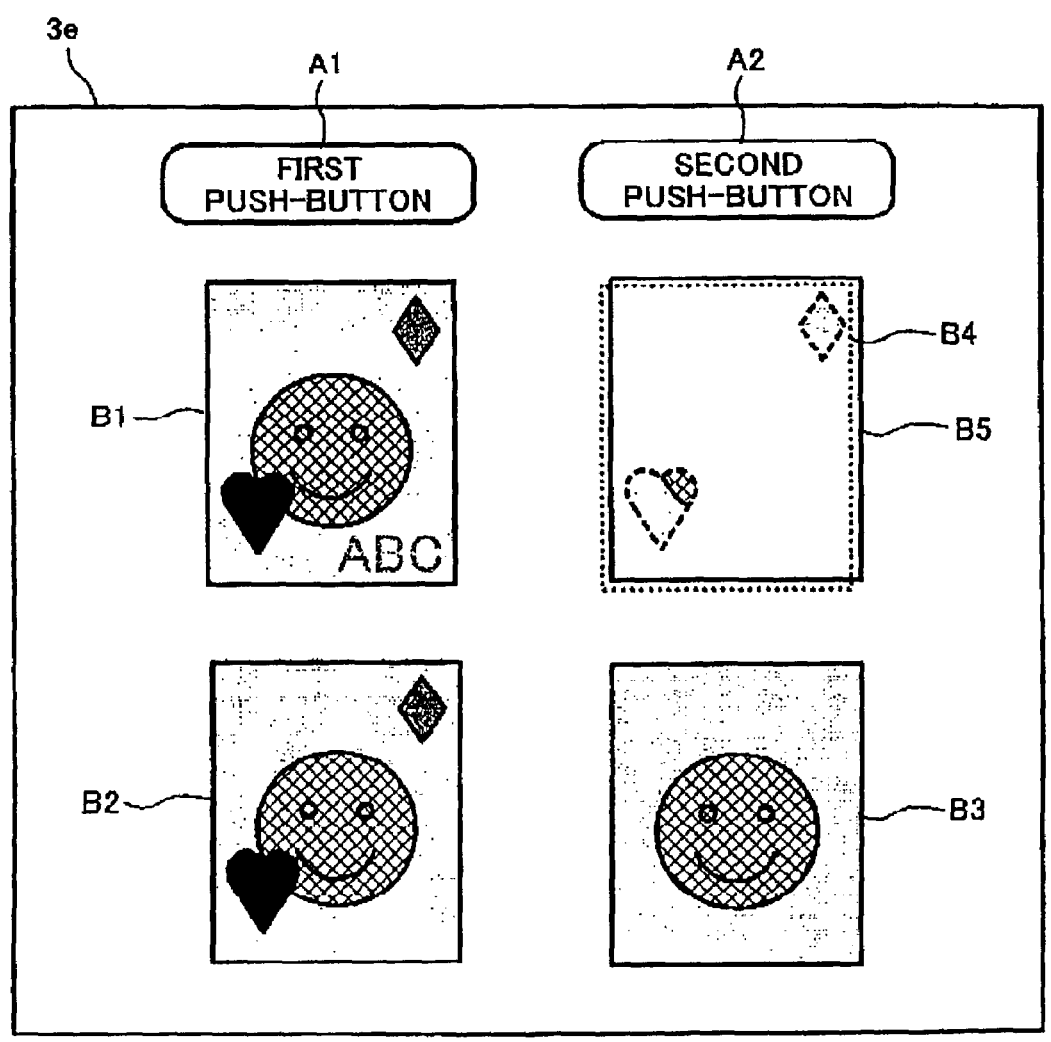

FIG. 2E demonstrates an alternate screen image 3e in which the screen images 3c and 3d are alternately displayed at least one cycle. This alternate display cycle can be set to an arbitrary number and, when a plurality of cycles are performed at intervals of a predetermined time period, differences in the first and second subtractive images B4 and B5 are flickering at the intervals of the predetermined time period since the image elements in the screen images 3c and 3d are located respectively at the same positions.

As in the same way with the screen image 3b of FIG. 2B, a third corrected image (not shown) can be obtained by correcting the input image B1 through the weak-image elimination using a next threshold value following the second threshold value Th2. In this way, many successively corrected images can be obtained through the weak-image elimination using a plurality of predetermined stepped-threshold values.

The above-mentioned plurality of stepped-threshold values which include the first and second threshold values Th1 and Th2 are stored in the memory 13 and can be changed arbitrarily by a user instruction through the first input unit 1 or the programs sent from the server through the network. The first threshold values Th1 and Th2, the predetermined white density value, the number of the alternate display cycle, and a value of the predetermined time period are also stored in the memory 13 and can be changed arbitrarily by a user instruction through the first input unit 1 or the programs sent from the server through the networks.

In addition, the positions and sizes of the above-described image elements contained in the screen images 3a-3d are also stored in the memory 13 and can also be changed arbitrarily according to a user instruction through the first input unit 1 or the programs sent from the server through the network.

The first push-button icon A1 serves as a button to complete the weak-image elimination when the first push-button icon A1 is clicked. The second push-button icon A2 serves as a button to start an image correction using the second threshold value Th2 or a different subsequent threshold value. The second push-button icon A2 also serves as a button to alternate the first and second subtractive images B4 and B5 in the screen, or the first subtractive image B4 and a subsequent subtractive image in the screen.

As alternatives to the first and second push-button icons A1 and A2, respective switch buttons may be provided to the first input unit 1, for example.

The image processing apparatus 100 is provided with various display modes including first and second display modes to select one of the first and second subtractive images B4 and B5. The first display mode selects a screen image displaying the first subtractive image B4. The second display mode selects a screen image displaying the second subtractive image B5. The first and second display modes can be switched with the second push-button icon A2.

Figure 3:
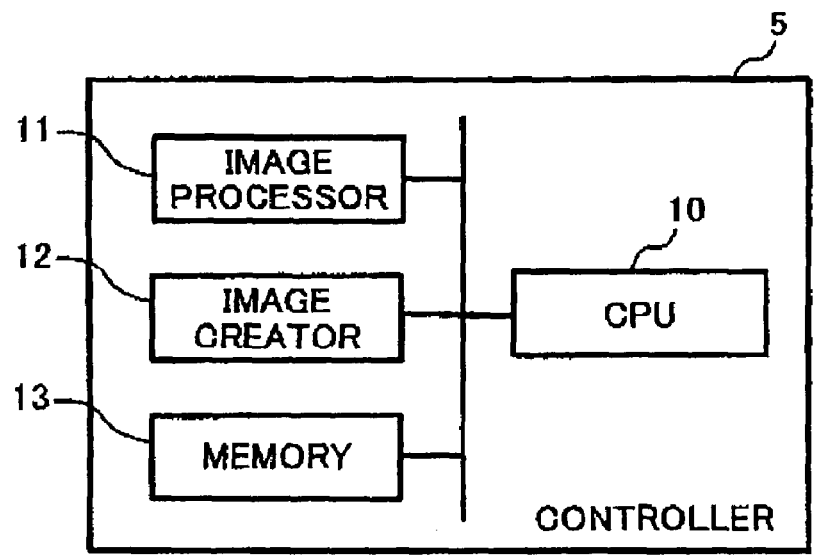
FIG. 3 is a block diagram of a controller included in the image processing apparatus of FIG. 1.

FIG. 3 shows an exemplary structure of the controller 5 which includes the CPU 10, an image processor 11, an image creator 12, and the memory 13. The image processor 11 handles the image processing operation in collaboration with the CPU 10 in accordance with the image processing programs stored in the memory 13. The image creator 12 generates the first and second subtractive images B1 and B2 and also successive subtractive images when instructed. The image creator 12 performs this image creation in collaboration with the CPU 10 in accordance with the image processing programs stored in the memory 13.

Figure 4:
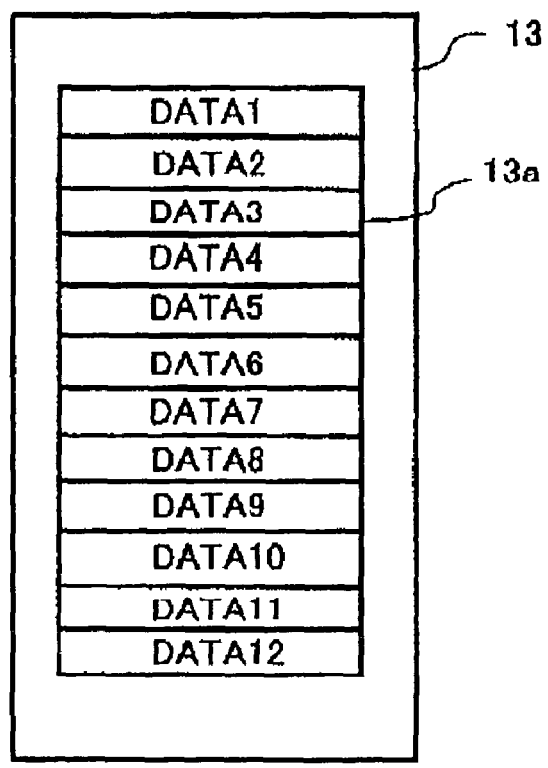
FIG. 4 is an illustration of a memory map for explaining the contents of the memory included in the controller of FIG. 3.

FIG. 4 shows an exemplary map of the memory 13. As shown in FIG. 4, the memory 13 includes a memory area 13a which includes data blocks DATA1-DATA12, for example. The first and second threshold values Th1 and Th2 and successive threshold values Th3, Th4, and Th5, for example, are assigned to the data blocks DATA1, DATA2, DATA3, DATA4, and DATA.5, respectively, for example. The predetermined white density value, the number of the alternate display cycle, and the value of the predetermined time period are assigned to the data blocks DATA6, DATA7, DATA8, respectively. Also, the positions and sizes of the image elements contained in the screen images 3a, 3b, 3c, and 3d are assigned to the data blocks DATA9, DATA10, DATA11, and DATA12, for example.

Figure 5:
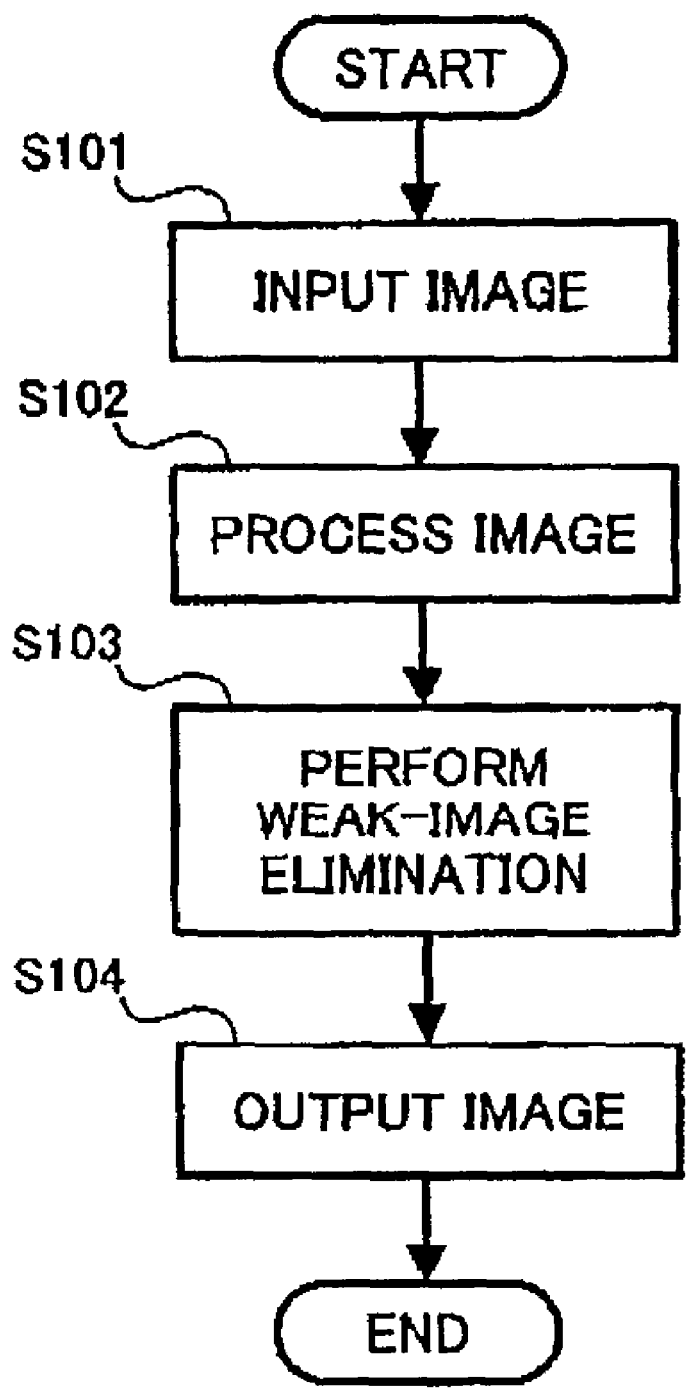
FIGS. 5 and 6 are flowcharts for explaining an image correction by the weak-image elimination of the image processing apparatus of FIG. 1.
Figure 6:
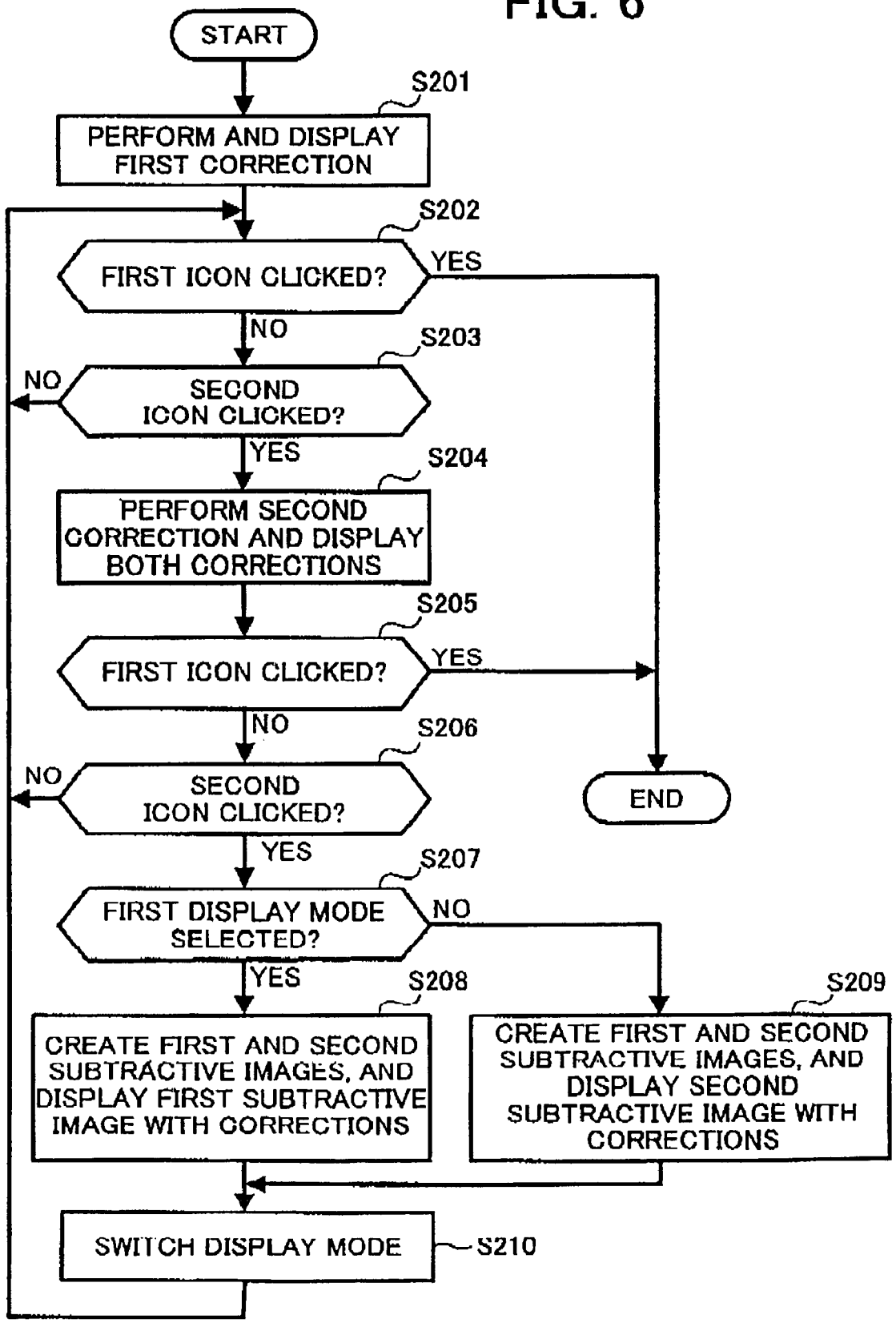

Referring to flowcharts of FIGS. 5 and 6, the weak—image elimination performed by the image elimination performed by the image processing apparatus 100 is explained. FIG. 5 shows an outline of the image processing operation performed by the image processing apparatus 100. In step 101 of FIG. 5, the image processing apparatus 100 obtains the input image B1 through the first input unit 1. Then, in Step S102, the image processing apparatus 100 performs a primary correction including a shading correction, a color correction, and so on relative to the input image B1. Then, in Step 103, the image processing apparatus 100 performs the weak-image elimination relative to the input image B1 and consequently obtains the second corrected image B3 as a satisfactory quality image. In Step S104, the image processing apparatus 100 displays the second corrected image B3 with the display unit 3.

An exemplary procedure of the weak-image elimination performed by Step S103 of FIG. 5 is explained in detail with reference to FIG. 6. In Step S201 of FIG. 6, the CPU 10 instructs the image processor 11 to perform a first correction of the image density threshold using the first threshold value Th1 relative to the input image B1 and obtains the first corrected image B2. Also in Step S201, the CPU 10 instructs the display unit 3 to display the input image B1 and the first corrected image B2 in one screen image as the screen image 3a of FIG. 2A. In Step 3202, the CPU 10 checks whether the first push-button icon A1 is clicked. When the first push-button icon A1 is determined as being clicked and the check result of Step S202 is YES, the first corrected image B2 is judged as acceptable by the user. Then, the procedure of the weak-image elimination ends.

When the first push-button icon A1 is determined as not clicked and the check result of Step S202 is NO, the first corrected image B2 is judged as not acceptable by the user and the process proceeds to Step S203. Subsequently, in Step S203r the CPU 10 checks whether the second push-button icon A2 is clicked. When the second push-button icon A2 is determined as not clicked and the check result of Step S203 is NO, the process returns to Step S202 to restart the check of the first push-button icon A1.

When the second push-button icon A2 is determined as being clicked and the check result of Step S203 is YES, the process goes to Step S204 in which the CPU 10 instructs the image processor 11 to perform a second correction of the image density threshold using the second threshold value Th2 relative to the input image B1 and obtains the second corrected image B3. After that, also in Step S204, the CPU 10 instructs the display unit 3 to display the input image B1, the first corrected image B2, and the second corrected image B2 in one screen image as the screen image 3b of FIG. 2B.

In Step S205, the CPU 10 checks whether the first push-button icon A1 is clicked. When the first, push-button icon A1 is determined, as being clicked and the check result of Step S205 is YES, the second corrected image B3 is judged as acceptable by the user. Then, the procedure of the weak-image elimination ends. When the first push-button icon A1 is determined as not clicked and the check result of Step S205 is NO, the second corrected image B3 is judged as not acceptable by the user and the process goes to Step S206. Subsequently, in Step S206, the CPU 10 checks whether the second push-button icon A2 is clicked. When the second push-button icon A2 is determined as not clicked and the check result of Step S206 is NO, the process returns to Step S202 to restart the check of the first push-button icon A1. In this case, it is possible to terminate the process immediately by Step S202 or to proceed to the performance of a third correction of the image density threshold using the third threshold value Th3 relative to the input image B1. In the latter case, the image processing apparatus 100 can show the user an image corrected with a greater threshold value of image density. The user can continue this process five times since the stepped-threshold values Th1-Th5 are prestored in the memory 13.

When the second push-button icon A2 is determined as being clicked and the check result of Step S206 is YES, the process goes to Step S207 in which the CPU 10 further checks whether the first display mode is initially selected. When the first display mode is determined as being selected and the check result of Step S207 is YES, the process goes to Step S208. In Step S208, the CPU 10 instructs the image creator 12 to create the first subtractive image B4 based on the first and second corrected image B2 and B3. The CPU 10 further instructs the image creator 12 to create the second subtractive image B5 based on the first and second corrected images B2 and B3. Subsequently, also in Step S208 the CPU instructs the display unit 3 to display the input image B1, the first corrected image B2, the second corrected image B3, and the first subtractive image B4 in one screen as the screen image 3c of FIG. 2C.

When the first display mode is determined as not selected and the check result of Step S207 is NO, the process goes to step S209. In step S209, the CPU 10 instructs the image creator 12 to create the first subtractive image B4 based on the first and second corrected images B2 and B3. The CPU 10 further instructs the image creator 12 to create the second subtractive image B5 based on the first and second corrected images B2 and B3. Subsequently, also in Step S209, the CPU instructs the display unit 3 to display the input image B1, the first corrected image B2, the second corrected image B3, and the second subtractive image B5 in one screen as the screen image 3d of FIG. 2C.

After Step S208 or Step S209, the CPU instructs the display unit 3 to switch the display mode from the first display mode to the second display, in Step S210. Thereby, the screen is changed from screen image 3c to screen image 3d. When the number of the alternate display cycle is set to 3, for example, and the predetermined time period is set to one second, for example, the display unit 3 switches between the screen images 3c and 3d three times at intervals of one second so that the user can observe the screen as the screen image 3e of FIG. 2E. This facilitates a visual check of the two subtractive images as the results of the correction by the weak-image elimination. After Step S210, the process returns to Step S202 to allow the user to determine whether to terminate the process or to continue the correction by the weak-image elimination.

The present invention may be conveniently implemented using a conventional general purpose digital computer programmed according to the teachings of the present invention, as will be apparent to those skilled in the computer art. Appropriate software coding can readily be prepared by skilled programmers based on the teachings of the present invention, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. An image processing apparatus, comprising:
   an image reading mechanism configured to read an original image to produce an input image;
   a display displaying at least one image;
   a memory storing a plurality of stepped values representing an image density threshold parameter;
   an image processing mechanism configured to perform an image processing operation that includes generating a first corrected image by applying a first correction to the input image using a first stepped value of the plurality of stepped values, and generating a second corrected image by applying a second correction to the input image using a second stepped value of the plurality of stepped values;
   an image creating mechanism configured to create first and second subtractive images based on comparisons of the first corrected image and the second corrected image; and
   a controller configured to control the display to display the input image, the first corrected image, the second corrected image, the first subtractive image, and the second subtractive image in a screen image.

2. The image processing apparatus as defined in claim 1, wherein said image processing operation occurs at least two times.

3. The image processing apparatus as defined in claim 1, wherein said stepped values are in an increasing order.

4. The image processing apparatus as defined in claim 1, wherein the first corrected image is corrected by a first correction performed by the image processing mechanism and the second corrected image is corrected by a second correction performed by the image processing mechanism.

5. The image processing apparatus as defined in claim 1, wherein the image creating mechanism creates the first subtractive image by comparing the first corrected image with the second corrected image, subtracting common image elements between the first and second corrected images from the first corrected image, and assigning a predetermined white density value to an area where the common image elements are subtracted,
   and wherein the image creating mechanism creates the second subtractive image by comparing the first corrected image with the second corrected image, subtracting common image elements between the first and second corrected images from the second corrected image, and assigning the predetermined white density value to an area where the common image elements are subtracted.

6. The image processing apparatus as defined in claim 5, wherein said first and second subtractive images are created in units of pixel.

7. The image processing apparatus as defined in claim 5, wherein the controller controls a change of the predetermined white density value.

8. The image processing apparatus as defined in claim 1, wherein the controller controls the display to display the first and second subtractive images at a same position in an alternate fashion on the screen image.

9. The image processing apparatus as defined in claim 1, wherein the controller controls switching between a first display mode in which the display displays the screen image with the first subtractive image and a second display mode in which the display displays the screen image with the second subtractive image.

10. An image processing apparatus, comprising:
    image reading means for reading an original image to produce an input image;
    displaying means for displaying an image;
    storing means for storing a plurality of stepped values representing an image density threshold parameter;
    image processing means for performing an image processing operation that includes generating a first corrected image by applying a first correction to the input image using a first stepped value of the plurality of values, and generating a second corrected image by applying a second correction to the input image using a second stepped value of the plurality of stepped values;
    image creating means for creating first and second subtractive images based on comparisons of the first corrected image and the second corrected image; and
    controlling means for controlling the display to display the input image, the first corrected image, the second corrected image, the first subtractive image, and the second subtractive image in a screen image.

11. The image processing apparatus as defined in claim 10, wherein said image processing operation occurs at least two times.

12. The image processing apparatus as defined in claim 10, wherein said stepped values are in an increasing order.

13. The image processing apparatus as defined in claim 10, wherein the first corrected image is corrected by a first correction performed by the image processing means and a second corrected image is corrected by a second correction performed by the image processing means.

14. The image processing apparatus as defined in claim 10, wherein the image creating means creates the first subtractive image by comparing the first corrected image with the second corrected image, subtracting common image elements between the first and second corrected images from the first corrected image, and assigning a predetermined white density value to an area where the common image elements are subtracted,
    and wherein the image creating means creates the second subtractive image by comparing the first corrected image with the second corrected image, subtracting common image elements between the first and second corrected images from the second corrected image, and assigning the predetermined white density value to an area where the common image elements are subtracted.

15. The image processing apparatus as defined in claim 14, wherein said first and second subtractive images are created in units of pixel.

16. The image processing apparatus as defined in claim 14, wherein the controlling means controls a change of the predetermined white density value.

17. The image processing apparatus as defined in claim 10, wherein the controlling means controls the displaying means to display the first and second subtractive images at a same position in an alternate fashion on the screen image.

18. The image processing apparatus as defined in claim 10, wherein the controlling means controls switching between a first display mode in which the displaying means displays the screen image with the first subtractive image and a second display mode in which the displaying means displays the screen image with the second subtractive image.

19. An image processing method, comprising the steps of:
    storing a plurality of stepped values representing an image density threshold parameter;
    reading an original image to produce an input image;
    performing an image processing operation comprising:
        generating a first corrected image by applying a first correction to the input image using a first stepped value of the plurality of stepped values; and
        generating a second corrected image by applying a second correction to the input image using a second stepped value of the plurality of stepped values;
    creating first and second subtractive images image based on comparisons of the first corrected image and the second corrected image; and
    controlling a display of the input image, the first corrected image, the second corrected image, the first subtractive image, and the second subtractive image in a screen image.

20. The image processing method as defined in claim 19, wherein said image processing operation occurs at least two times.

21. The image processing method as defined in claim 19, wherein said stepped values are in an increasing order.

22. The image processing method as defined in claim 19, wherein the first corrected image is corrected by a first correction performed by the performing step and a second corrected image is corrected by a second correction performed by the performing step.

23. The image processing method as defined in claim 19, wherein the creating step creates the first subtractive image by performing the sub-steps of:
    comparing the first corrected image with the second corrected image;
    subtracting common image elements between the first and second corrected images from the first corrected image; and
    assigning a predetermined white density value to an area where the common image elements are subtracted,
    and wherein the creating step creates the second subtractive image by performing the sub-steps of:
    comparing the first corrected image with the second corrected image; subtracting common image elements between the first and second corrected images from the second corrected image; and
    assigning the predetermined white density value to an area where the common image elements are subtracted.

24. The image processing method as defined in claim 23, wherein said first and second subtractive images are created in units of pixel.

25. The image processing method as defined in claim 19, wherein the controlling step controls the display of the first and second subtractive images at a same position in an alternate fashion on the screen image.

26. A computer readable data recording medium storing a program for image processing comprising the steps of:
    storing a plurality of stepped values representing an image density threshold parameter;
    reading an original image to produce an input image;
    performing an image processing operation comprising:
        generating a first corrected image by applying a first correction to the input image using a first stepped value of the plurality of stepped values; and
        generating a second corrected image by applying a second correction to the input image using a second stepped value of the plurality of stepped values;
    creating first and second subtractive images based on comparisons of the first corrected image and the second corrected image; and
    controlling to display the input image, the first corrected image, the second corrected image, the first subtractive image, and the second subtractive image in a screen image.

27. The computer readable data storing medium as defined in claim 26, wherein said image processing operation occurs at least two times.

28. The computer readable data storing medium as defined in claim 26, wherein said stepped values are in an increasing order.

29. The computer readable data storing medium as defined in claim 26, wherein the first corrected image is corrected by a first correction performed by the performing step and the second corrected image is corrected by a second correction performed by the performing step.

30. The computer readable data storing medium as defined in claim 26, wherein the creating step creates the first subtractive image by performing the sub-steps of:
    comparing the first corrected image with the second corrected image;
    subtracting common image elements between the first and second corrected images from the first corrected image; and
    assigning a predetermined white density value to an area where the common image elements are subtracted,
    and wherein the creating step creates the second subtractive image by performing the sub-steps of:
    comparing the first corrected image with the second corrected image; subtracting common image elements between the first and second corrected images from the second corrected image; and
    assigning the predetermined white density value to an area where the common image elements are subtracted.

31. The computer readable data storing medium as defined in claim 30, wherein said first and second subtractive images are created in units of pixel.

32. The computer readable data storing medium as defined in claim 26, wherein the controlling step controls to display the first and second subtractive images at a same position in an alternate fashion on the screen image.

* * * * *